Aug. 15, 1967     TERUO ŌYA ET AL     3,335,456
PAN-TYPED GRANULATING MACHINE
Filed Sept. 13, 1965     4 Sheets-Sheet 1

INVENTOR.
TERUO ŌYA
MASAAKI TAKEUCHI
BY
ATTORNEYS

Aug. 15, 1967 TERUO ŌYA ETAL 3,335,456
PAN-TYPED GRANULATING MACHINE
Filed Sept. 13, 1965 4 Sheets-Sheet 4

TERUO ŌYA INVENTOR.
MASAAKI TAKEUCHI
BY
ATTORNEYS

United States Patent Office 3,335,456
Patented Aug. 15, 1967

3,335,456
PAN-TYPED GRANULATING MACHINE
Teruo Ōya, Kamakura, and Masaaki Takeuchi, Tokyo, Japan, assignors to Onoda Cement Company Limited, Onoda, Japan, and Nipponkai Heavy Industries Co., Ltd., Toyama, Japan
Filed Sept. 13, 1965, Ser. No. 486,967
Claims priority, application Japan, Sept. 29, 1964, 39/76,263; May 13, 1965, 40/27,573; May 20, 1965, 40/29,279
5 Claims. (Cl. 18—1)

This invention relates to a pan-typed granulating machine, and more particularly, to a machine having a rotary pan for use in granulating powdered material which has become so popular in many industries including steel manufacturing industry, fertilizer and cement industries as one of the effective methods for processing such material used in those industries.

The present invention consists in a granulating machine with a rotary pan so constructed that as the fine particles of the powdered material supplied to the inside of the rotary pan-shaped container, hereinafter referred to simply as a pan, for granulating process are wrapped up in the droplets of liquid ejected from above the pan through the nozzle of an ejector, these droplets of liquid which have enclosed the particles of the powdered material are coalesced by surface tension to form granule cores and as the pan is rotated these granule cores are rolled successively and stabilized by degrees, hardened and increased in size with accretion of the particles of powder adhering to the surfaces of the cores so as to attain the sufficient granular sizes where they are flown over the inclined rotary pan. This type of the granulating machine with a rotary pan as above noted belongs under the rotary-system granulating machine with the attached pan rotated at a suitable angle and best suited to the successive production of the granules with the granule sizes of 5 to 50 mm. diameter at the efficiency of 1 to 100 t./h.

Thus the present invention is directed to an improvement in the pan-rotary device in the granulating machine of this kind having a rotary pan and also to an improvement in the adjustment device for adjusting the tilt of the rotary pan accompanying the improvement in the pan-rotary device.

Formerly, the typical granulating machine with a rotary pan which has been used in general, especially the larger one with relatively larger pan diameter is rotated about the shaft mounted at the center of the rotary pan equipped with a scraper for scrubbing the particles of powdered material adhering to the inside of the pan, thereby to promote the granulating process, and usually this kind of granulating machine is motor-driven through the gearing including gear and pinion equipped to the underside of the pan and connected to the motor through the pinion shaft and the reduction gear such as the worm gear. However, the gearing has to be tilted simultaneously with the rotary pan and as a matter of course the device for adjusting the tilt of the rotary pan has also to be very complicated.

Moreover, in this type of the larger granulating machine equipped with a larger gearing the toothed surfaces of the gear-wheels are worn away in a short period of time due to the insufficient lubrication and the surroundings usually filled with dusts of powdery material, with the resultant production of mechanical vibration and sounds which still give rise to the injuries done to the machine and the costly upkeep accompanied with the lowered efficiency of the machine.

The present invention has been made with a view to simplifying the apparatus for adjusting the tilt of the rotary pan and supplies a granulating machine of this kind without the provision of gearing for rotating the pan which has these hindrances: and the granulating machine according to the present invention comprises a pan-shaped container provided with one or more nozzle for supplying the liquid to the inside of said container, one or more chutes for supplying the powdered material to the inside of said container, and one or more scraper for scrubbing the powdered material stuck to the inside of the pan-shaped container to promote the granulating process; a support for supporting said container by means of a plurality of rollers, said rollers being rotatably carried by shafts of metal fixtues mounted to said support in slidable engagement with the side wall or the bottom side of said container; a device installed on said support for driving one or more of said rollers; a base pivotally connected to said support; and means connected at one end to said support for adjustment of the tilt of said support and said pan carried by said support through the intermediary of said rollers.

The machine in accordance with the present invention has the following advantages as compared with the conventional machine having gearing:

(1) The mechanical vibrations and sounds accompanying the rotary movement of the pan are absorbed by the tires of rollers and the smooth run of the machine is ensured.

(2) The deflection of the pan from the concyclic path caused at the time of rotation is very small. With the conventional granulating machine using a gearing the deflection of the rotated pan from the circular path affecting the granulating capacitor of the machine increase to gradually with the detrition of the toothed surface of the gear-wheels, while according to the present invention there is no such defficiency which may result in a lowered efficiency of the machine.

(3) With the transmission mechanism as above described the overall simplified construction as well as considerable reduction in the gross weight of the machine has effected. Seeing that this type of the granulating machine is usually installed at an elevation, it is thought that reduction in the gross weight of the machine contributes largely to the rigidity of the plant structure.

(4) The cost of production is relatively low irrespective of the increase in the pan diameter, e.g. of 4 m. or 5 m. pan diameter. It may be deduced from this that the present invention is best suited to the granulating machine with a larger pan diameter.

(5) The machine can be run with a sufficient reserve power due to the high transmission capacity of the roller compared with the working load sustained by the pan.

(6) There is no loss or dispersion of lubricating oil aggravating the working environment.

In the attached drawings showing an embodiment of the present invention:

Figure 1:
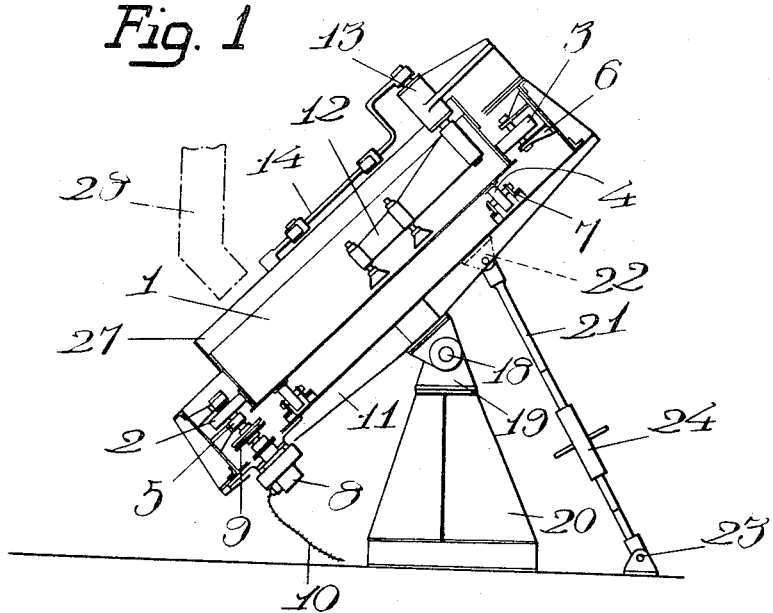
FIG. 1 is a partial vertical section in side elevation of the granulating machine with a rotary pan showing an embodiment of the present invention.
Figure 2:
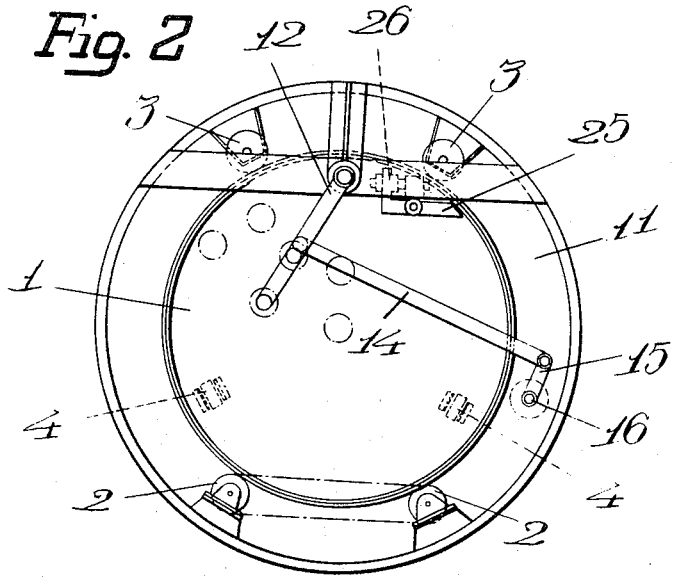
FIG. 2 is a plan view of FIG. 1.
Figure 3:
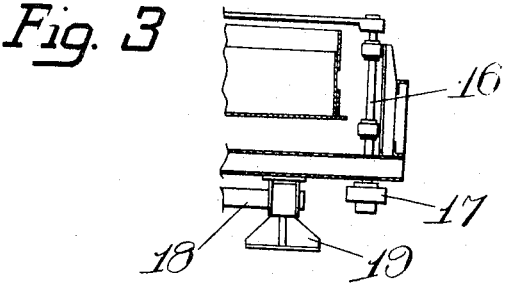
FIG. 3 is a partial view of FIG. 1, shown only in part.

Referring to FIGS. 1, 2, and 3, numeral 1 is a granulating pan with two driving rollers 2 and two wall supporting rollers 3 supporting or abutting on the circumferential wall of the pan and the granulating pan 1 is rotated at a prefixed position perpetually with these rollers and three or four bottom supporting rollers 4 engaging with the bottom thereof.

Numeral 5 are bearings for the driving rollers, 6 brackets for said supporting rollers 3, and 7 brackets for the bottom supporting rollers 4. The rotary pan 1 is rotarily driven through the two driving rollers 2 driven by the hydraulic motor 8 for driving the pan 1 by way of the chain wheel 9 and numeral 10 is a flexible tube attached to the hydraulic motor 8. In this way, the driving rollers 2 for driving the rotary pan, the supporting rollers 3 for supporting the circumferential wall of the rotary pan and the supporting rollers 4 for supporting the bottom of the rotary pan are mounted at suitable positions on a support 11 and the rotary pan 1 is held in position. Each of these rollers may either be rounded by a tire such as synthetic rubber tire or a pneumatic tire.

While in the construction above described both of the driving rollers are driven, the pan may be driven by one of the driving rollers or by the bottom supporting rollers 4, the axles of which are connected to the hydraulic motor. In this instance, the driving rollers installed to the support 11 so as to slidably engage with the side wall of the rotary pan merely serve for supporting the load given onto the rotary pan. They may independently be connected to individual hydraulic motors so that they can be driven independently and selectively. Numeral 12 is a bottom scraper moving to and fro between the center and the wall of the rotary pan 1 for scrubbing the fine particles stuck to the bottom of the pan to promote the granulating operation. The bottom scraper 12 is driven by the driving hydraulic motor 17 through the intermediary of the scraper support metal fixture 13, scraper arm 14, scraper driving crank 15 and scraper driving shaft 16.

The support 11 is mounted on a base 20 by a shaft 18 and a metal fixture 19 provided at the top of the base so that the support 11 and the pan 1 may be movable with the supporting shaft 18 as its center. Numeral 21 is an adjustment lever attached at the upper end to the support 11 with the upper adjustment metal fixture 22 and at the lower adjustment metal fixture 23 for adjusting the tilt of the rotary pan, with an adjustment handle 24 for adjusting the inclination of the rotary pan being equipped about halfway of the adjustment lever 21. Numeral 25 is a rotary-pan side scraper attached to the rotary-pan side scraper metal fixture 26 for scrubbing powdery material stuck in layers or flakes to the side of the pan 1, and 27 an adjustment board vertically movably and adjustably mounted to the circumference of the pan 1 for adjusting the granulating interval of the powdered material contained in the pan.

Figure 9:
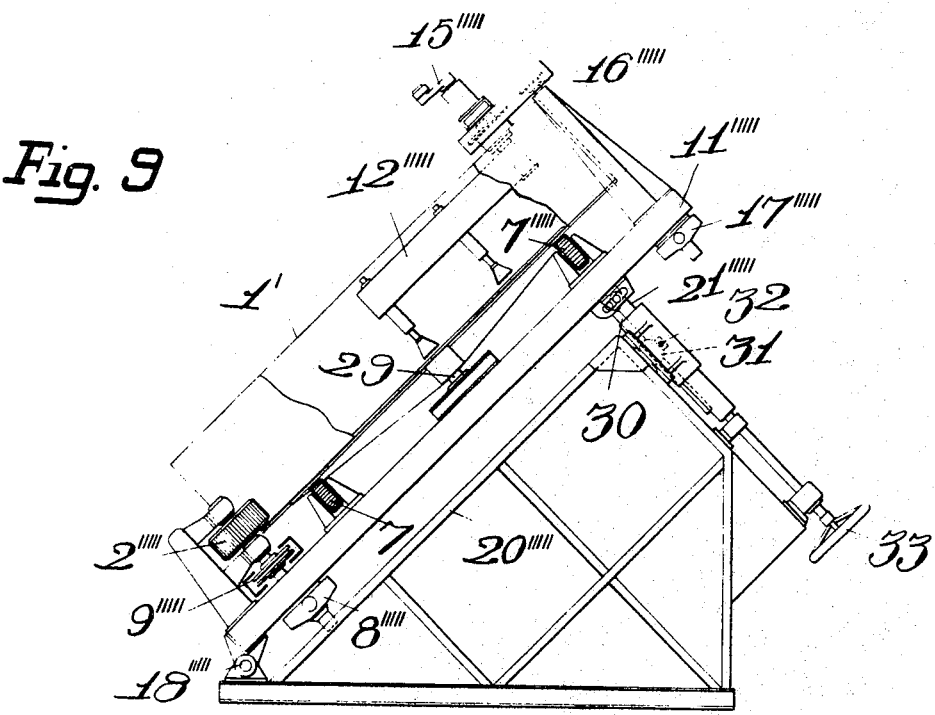
FIG. 9 is a partial vertical section in side elevation showing a further embodiment of the granulating machine according to the present invention.

With such structure of the present invention, as the hydraulic motor 8 is started to be rotated the two driving rollers 2 are rotated through the chain wheel 9, and the pan 1 is rotated. With the supporting rollers 3 engaging with the side wall of the pan and the bottom supporting rollers 4 engaging with the bottom surface of the pan, the pan 1 is rotated smoothly. The supporting rollers 3 are also useful to prevent the rotary pan 1 from being whirled about outwardly whenever a partially heavy load is applied to a part of the rotary pan, with that part of the rotary pan as its center, and causing such a danger. As shown in FIG. 9, instead of the wall supporting rollers 3, a bearing 29 may be provided centrally of the bottom of a pan 1' adjusted to engage with the shaft on a support 11' to ensure the regular circular rotation of the pan 1'.

The powdered material supplied to the inside of the pan 1 (FIG. 1) through the chute 28 mounted above the pan 1 is raised in the rotary direction and granulated with the liquid ejected through the nozzle of the ejector (not shown) installed above the pan, while the bottom scraper 12 is driven by the associated hydraulic motor 17 by way of the scraper driving shaft 16, scraper driving crank 15, scraper arm 14 and the like and moved to and fro between the center and outer edge of the rotary pan to promote the granulating process, scrubbing the desiccated flakes or layer of powdered material affixed to the bottom of the pan, while the desiccated flakes or layer of powdered material stuck to the side wall of the pan 1 are scrubbed with the rotary-pan side scraper 25. Thus the granulating process is made easy and promoted by the scrubbing motion of the scrapers 12, 25.

Thus granules flown over the rotary pan 1 are received in a conveying machine placed below the front side of the rotary pan and conveyed for further process.

Figure 6:
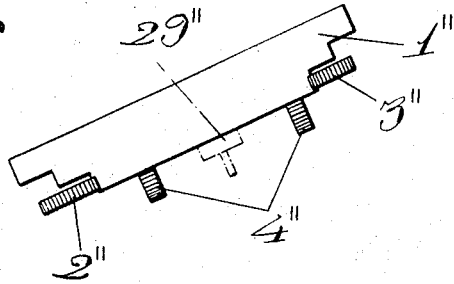
FIGS. 6 to 8 are explanatory views each showing the embodiments of the present invention in which the pan-like container is replaced by the bowl-shaped or other transfigured containers.
Figure 7:
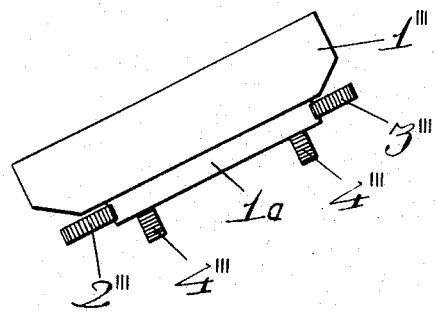
Figure 8:
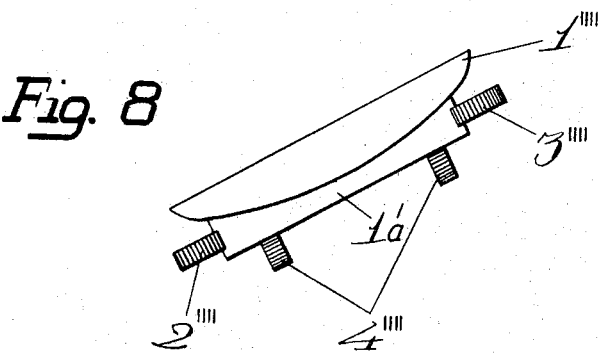

The adjustment of working time for powdered material may be done with facility by manually reciprocating the adjustment board 27 attached to the rim of the rotary pan 1 in a vertical direction while the adjustment of the tilt of the rotary pan 1 in case of a necessity may be achieved during the granulating process by manually turning the adjustment handle 24. Though the term "pan-shaped" reminds one of the flat circular bottom with upright circular side wall formed around the bottom, the rotary pans 1", 1''' and 1'''' of various figures such as are shown in FIGS. 6, 7 and 8 are actually used, and a bowl-shaped pan 1 with a circular rim may be used with ease if equipped with the cylindrical receptacle 1', fitted to the bottom portion thereof. Similar parts are designated with the same numerals but with a prime added for each of the various embodiments shown. The pans 1''' and 1'''' of FIGS. 7 and 8 have bottom cylindrical portions 1a and 1a'.

Figure 4:
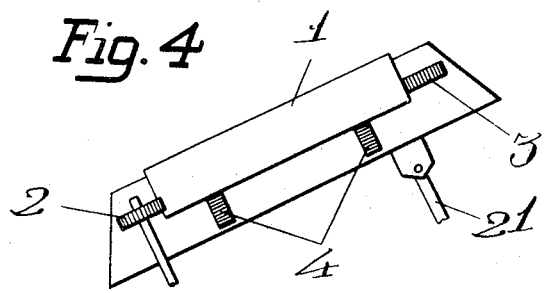
FIG. 4 is an illustrative view showing diagrammatically the characteristic feature of the granulating machine according to the present invention.
Figure 5:
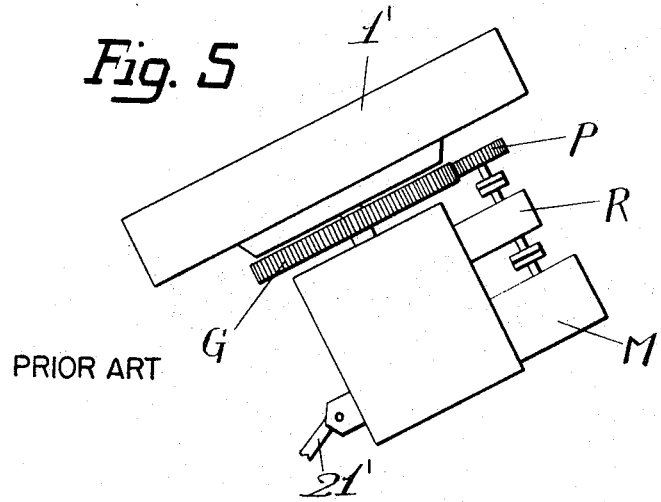
FIG. 5 is an illustrative view showing the granulating machine of this kind used in conventional practice diagrammatically and in contradiction to the granulating machine of FIG. 4.

The present invention worked in this way provides by far the most ideal torque transmission system available in this type of the granulating machine in which the drive is effected with its specific circumferential drive system designed to decrease the amount of torque with the driving rollers engaging the side wall of the rotary pan, instead of the conventional gear G and the pinion P driven by motor M through reduction gear R as shown in FIG. 5 in contradiction to the granulating machine of the present invention, the principal features of which are illustrated in FIG. 4, and the load of the rotary pan is transmitted by way of the driving rollers and three or four bottom supporting rollers while the pan is rotated.

In FIG. 9 a further embodiment of the present invention is shown wherein the specific load transmission system for the rotary pan and the material to be granulated is used. In this embodiment the load of the rotary pan and the material to be granulated are sustained directly by the driving rollers 2''''' and three or four bottom supporting rollers 7''''' installed below the pan 1' and transmitted by way of the support 11''''' further to the lower supporting pins 18 installed at two positions below the support 11''''' and the two upper supporting levers 30 and the adjustment lever 21''''' for adjusting the inclination of the pan 1 and to the ground or floor by way of the base 20.

In adjusting the angle of inclination of the rotary pan, the nut 32 of the hinge 31 tightening the upper supporting levers 30 pivoted to the right and left of the support 11''''' to the corresponding two positions on the base 20''''' are slackened in the first place and the adjustment lever 21''''' raised or lowered by manually turning the handle 33. The support 11''''' may then be turned pivotally with the lower supporting pin 18 as its fulcrum point and thereby the angle of inclination may be adjusted. The upper supporting lever 30 is held tightly to the base 20''''' by a metal fixture 31 after the tilt of the pan is adjusted. When the tilt of the pan is adjusted, the upper support lever 30 is again clamped to the base 20''''' by the metal fixture 31 and the machine is ready to be operated.

The other members in the embodiment shown in FIG. 9 are the same as in the foregoing embodiment shown in FIGS. 1, 2 and 3 and the same members in the embodiment of FIG. 9 are indicated by the same reference numbers.

What is claimed is:

1. A granulating machine comprising a rotatable generally pan-shaped container, a mounting base, a support member pivotally mounted on said mounting base, means connected to said support member to position said support member at a selected inclination in respect to said mounting base and to the horizontal, at least two radially spaced pan bottom support rollers rotatably mounted on said support member for rotation about axes substantially perpendicular to the axis of rotation of said pan member, each of said rollers having peripheries in engagement with and rotatably supporting the bottom of said container, at least three radially spaced pan side-supporting rollers rotatably mounted on said support member for rotation about axes substantially parallel to the axis of rotation of said pan member, each of said pan side supporting rollers having peripheries in engagement with a side of said pan-shaped container and rotatably engaging the sidewalls of said container and providing a lateral support therefor, and a motor connected to at least one of said side rollers and driving said side rollers for rotating said pan.

2. A granulating machine according to claim 1, including a scraper comprising an arm pivotally supported on said support member and extending over the top of said pan with means thereon for engaging into the pan-shaped container for scraping the materials therein, and means connected to said arm to swing said arm backwardly and forwardly to effect a scraping action.

3. A granulating machine according to claim 2, wherein said means connected to said arm to swing it backwardly and forwardly include a driving motor and linkage means connected between said driving motor and said arm.

4. A granulating machine according to claim 1, including a driving motor connected to at least one of said pan side supporting rollers to drive said roller and a belt interconnecting two of said rollers for driving said rollers to drive said pan at spaced locations around the periphery of said pan.

5. A granulating machine according to claim 4, including a scraper for scraping materials in said pan comprising a scraper arm member pivotally mounted on said support member and extending over the top of said pan and including a portion thereof which extends downwardly into said pan, and motor-driven means connected to said arm member for oscillating said arm member backwardly and forwardly in said pan, said means for positioning said support member in relation to said mounting base comprising an adjustment lever pivotally connected to said support member at one end and adapted to have its other end connected to a fixed support and adjustable means associated with said support member for shortening and lengthening said support member in order to change the tilting angle of said support member in respect to said base.

References Cited

UNITED STATES PATENTS

| | | | |
|---|---|---|---|
| 2,493,421 | 1/1950 | Rolfsen. | |
| 2,642,343 | 6/1953 | Studebaker. | |
| 2,889,575 | 6/1959 | Larson et al. | 18—1 |
| 2,923,965 | 2/1960 | Djuvik | 18—1 |
| 3,002,503 | 10/1961 | Bongiovanni | 91—58 X |
| 3,010,145 | 11/1961 | Rolfsen | 18—1 |

WILLIAM J. STEPHENSON, *Primary Examiner.*